Feb. 5, 1957  R. C. EDWARDS  2,780,268
APPARATUS FOR MAKING LIPPED FINNED TUBING
Filed April 10, 1951  5 Sheets-Sheet 1

RAY C. EDWARDS
*INVENTOR.*
BY
*Attorney*

RAY C. EDWARDS
INVENTOR.

BY [signature]
attorney

Feb. 5, 1957 R. C. EDWARDS 2,780,268
APPARATUS FOR MAKING LIPPED FINNED TUBING
Filed April 10, 1951 5 Sheets-Sheet 3

RAY C. EDWARDS
*INVENTOR.*

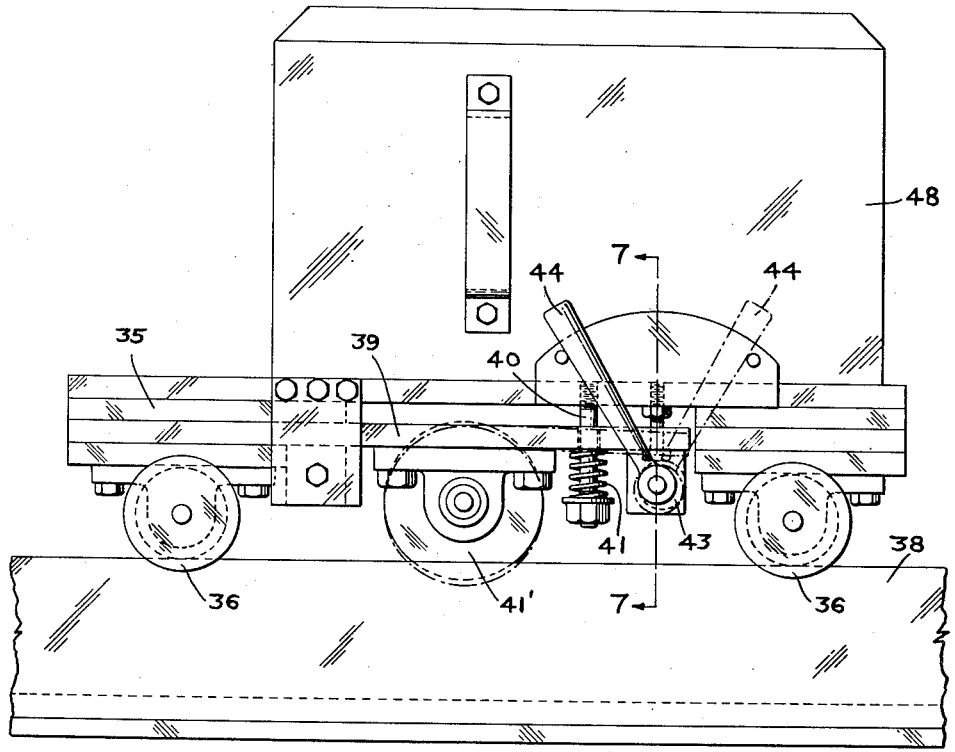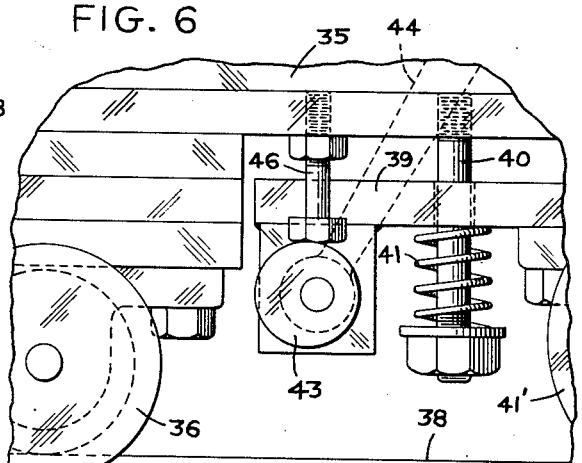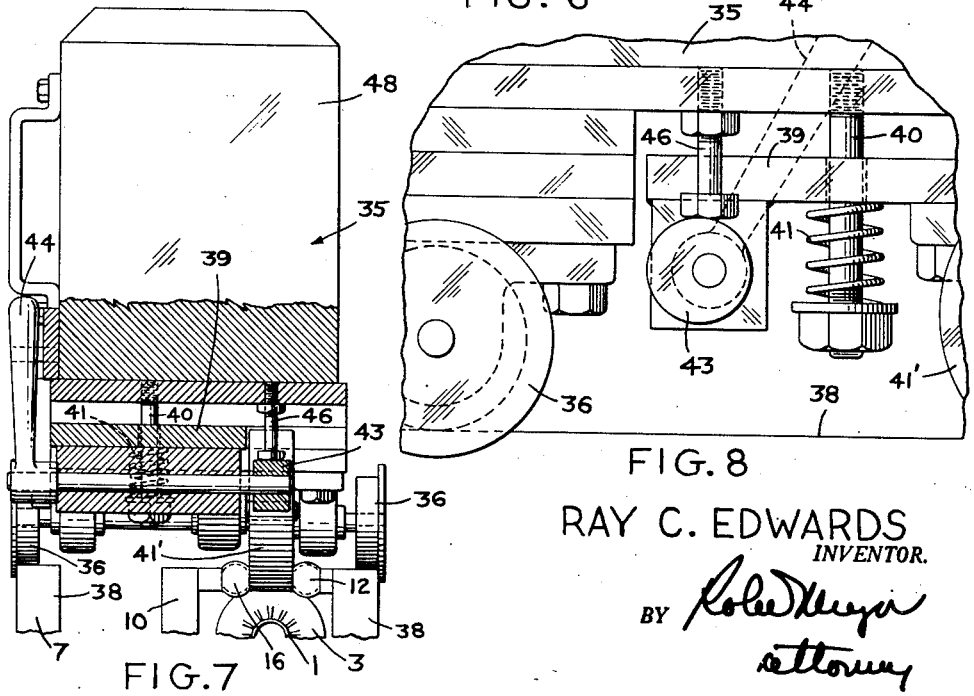

Feb. 5, 1957 R. C. EDWARDS 2,780,268
APPARATUS FOR MAKING LIPPED FINNED TUBING
Filed April 10, 1951 5 Sheets-Sheet 5

RAY C. EDWARDS
*INVENTOR.*

United States Patent Office 2,780,268
Patented Feb. 5, 1957

2,780,268
APPARATUS FOR MAKING LIPPED FINNED TUBING

Ray C. Edwards, Glen Rock, N. J.

Application April 10, 1951, Serial No. 220,286

12 Claims. (Cl. 153—21)

This invention relates to lipped finned tubing as disclosed and claimed in my co-pending application, Serial No. 220,285 filed April 10, 1951, now abandoned, and more particularly to apparatus for and the method of making such lipped finned tubing.

As disclosed in said application, the finned tubing comprises a metal tube on which is spirally wound crimped metal ribbon to form fins which increase the heat transfer properties of the tube, however, unlike the usual type of finned heat transfer tube the present tube is free from bonding by a heat conductive metal between the fin and tube and the fins are rigidly and securely held in place by the engagement of their inner crimped edges with the tube and by the bonding of the inner crimped edges to the tube and the bonding of the overlapping portions of the laterally extending lips which are formed on the fins by a bonding resin as disclosed in my companion application filed of even date herewith, thus providing a strong sturdy tube which while free from the disfigurement in handling will permit portions of the fin to be stripped from the ends of the tube for various reasons.

An object of the present invention is to provide apparatus for and the method of making such tubes by means of which the tubes may be made rapidly and economically in a substantially continuous operation from bare tube to lipped finned tube of desired length ready for boxing or shipment.

Another object of the present invention is the provision of means for securely holding the finned tubes while forming the lips on the fins together with means for forming the lips on the fins.

With these and other objects in view, as may appear from the accompanying specification, the invention consists of various features of construction and combination of parts, which will be first described in connection with the accompanying drawings, showing apparatus for making lipped finned tubing of a preferred form embodying the invention, and the features forming the invention will be specifically pointed out in the claims.

In the drawings:

Figure 6 is a side elevation of the lip forming apparatus.

Figure 7 is a section taken on the line 7—7 of Figure 6.

Figure 8 is an enlarged detailed view of a part of the lip forming apparatus.

Figure 1:
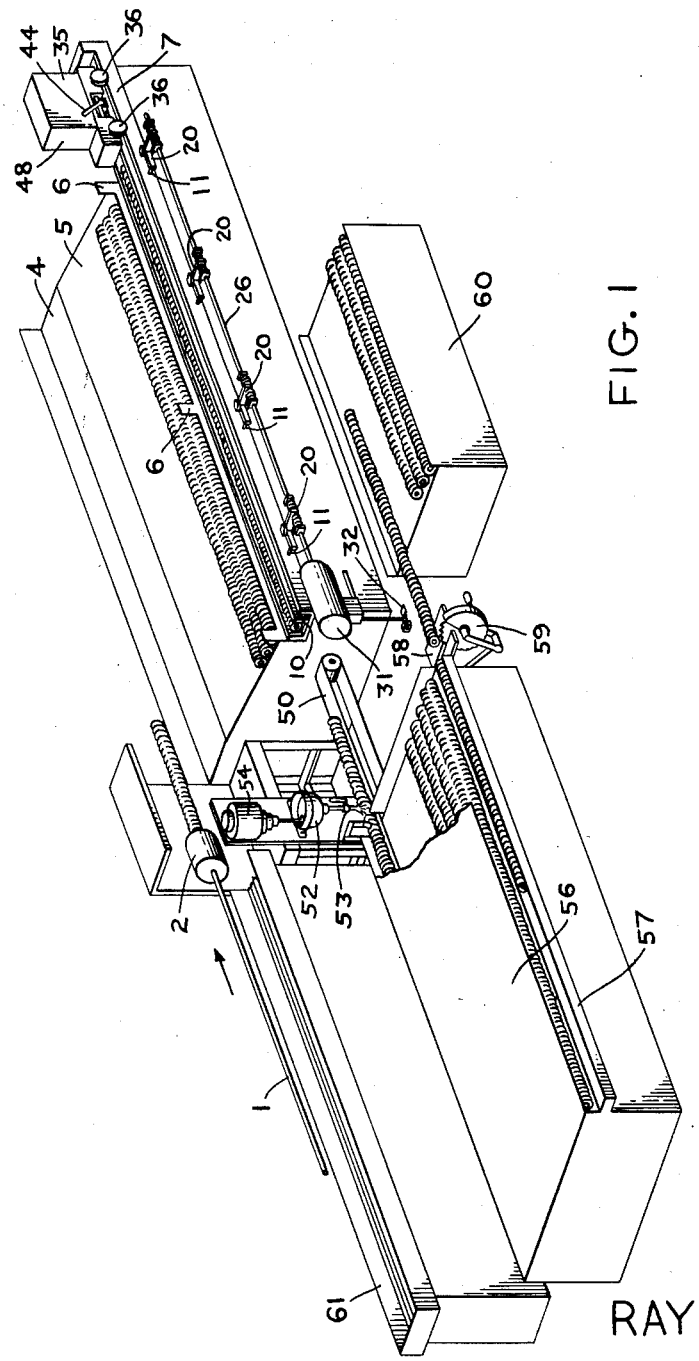
Figure 1 is a perspective view illustrating the complete assembly for making the lipped finned tubes, part of the apparatus being generically indicated.
Figure 2:
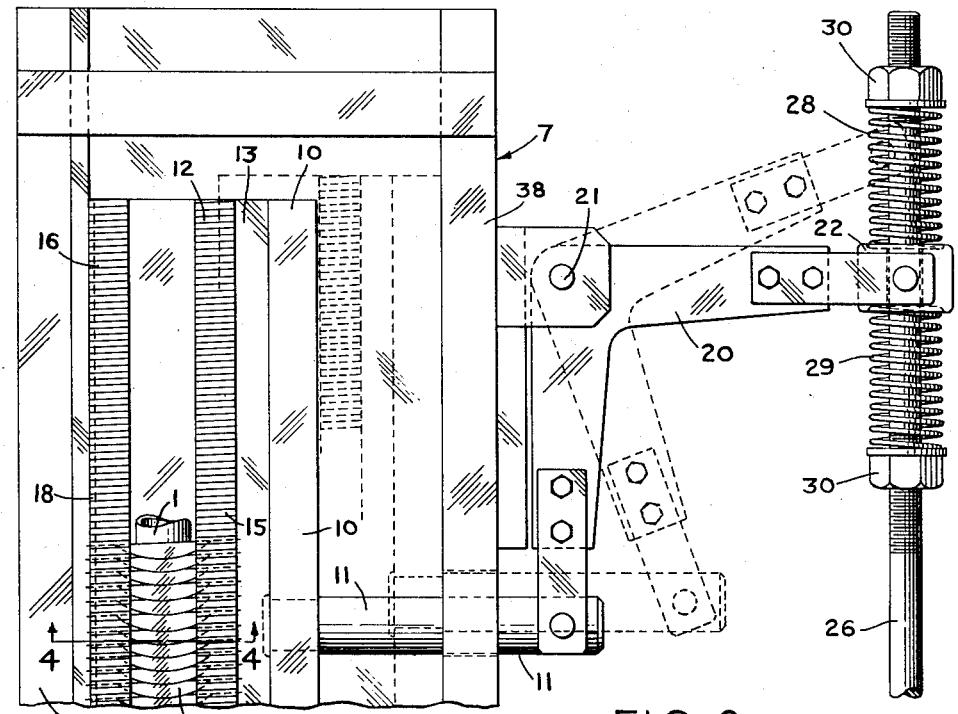
Figure 2 is a fragmentary plan view of the apparatus illustrating the mechanism for holding the finned tubes during the forming of the lips on the fins.
Figure 11:
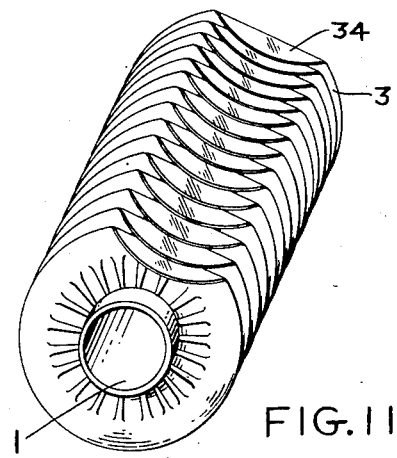
Figure 11 is a perspective view of a fragment of a finished lipped finned tube.
Figure 12:
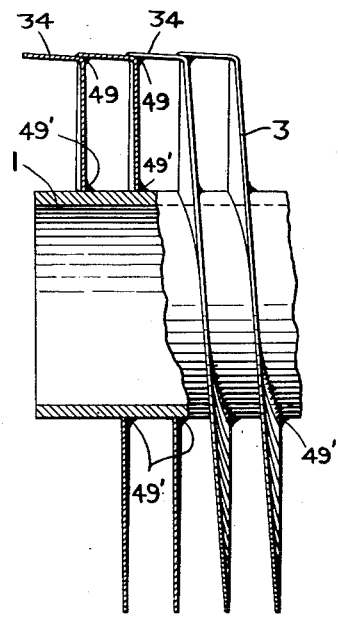
Figure 12 is a fragmentary longitudinal section through a part of a finished finned tube.

Referring particularly to the drawings, Figure 1 shows a perspective view of the entire assembly for manufacturing the lipped finned tubes and in this view the bare metal tube 1 is fed into a mechanism 2 which winds a metal ribbon, indicated at 3 in Figures 11 and 12 of the drawings, spirally about the tube to form fins thereon.

The fin winding mechanism 2 may be of any approved type which may be purchased upon the open market or it may be of the type shown in my co-pending application, Serial No. 17,983 filed March 30, 1948.

Also, the mechanism 2 may simply be the mechanism for crimping, winding the fin on the tubes and ironing out the peripheral crimps in the fins without employing the mechanism for bonding or soldering the fins to the tubes, but if it is desired the fins may be soldered or otherwise bonded to the tube without departing from the spirit of the present invention.

The tube, after the metal ribbon has been spirally wound thereon to form the fins, moves upon a table 4 which has an inclined portion 5 so that the finned tubes will roll downwardly towards the stops 6 formed at the lower outer edge of the inclined portion of the table 5.

Figure 3:
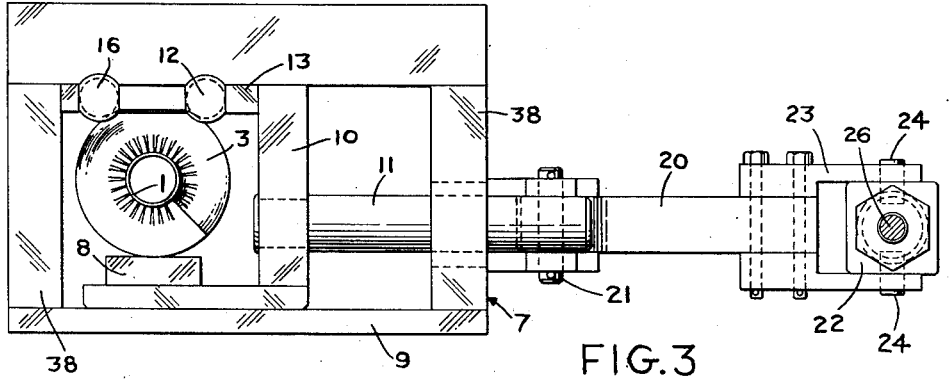
Figure 3 is an end view of the mechanism shown in Figure 2.
Figure 9:
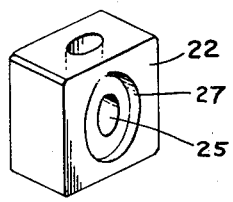
Figure 9 is a detailed perspective view of a form of nut employed in the apparatus.
Figure 5:
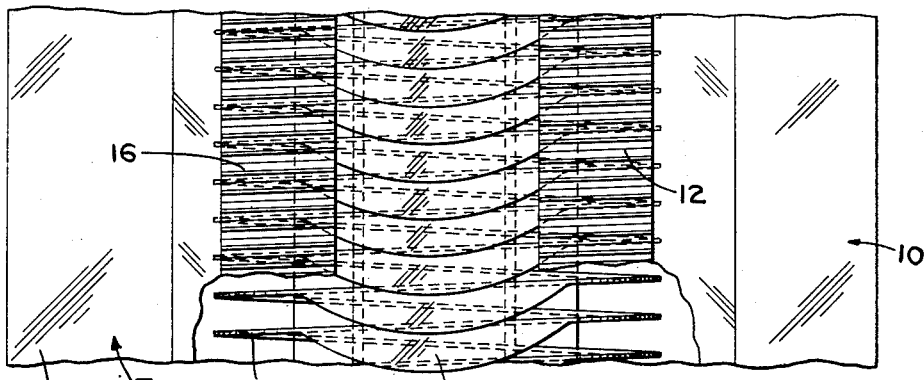
Figure 5 is an enlarged fragmentary view in plan of the structure shown in Figure 4.
Figure 4:
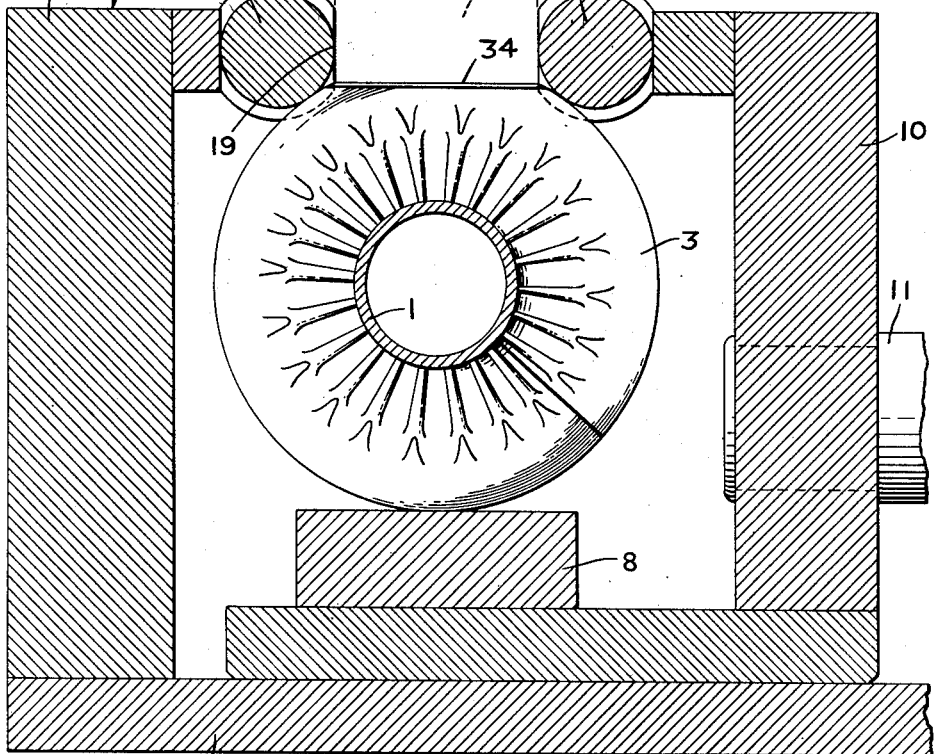
Figure 4 is an enlarged cross section taken on the line 4—4 of Figure 2.
Figure 10:
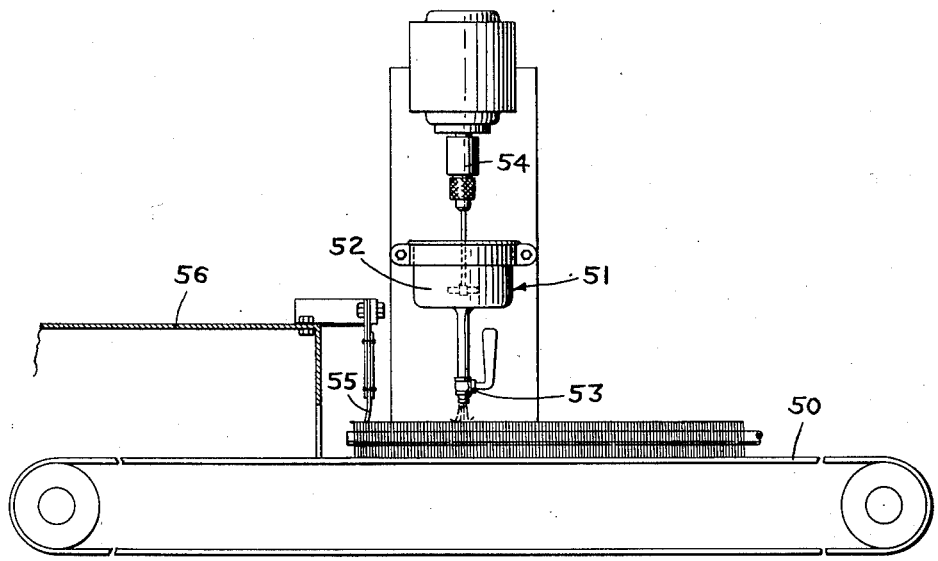
Figure 10 is a side elevation of the bonding agent applying means.

A trough 7 is positioned along the lower outer edge of the table 4 with its open top slightly below the forward edge of the table 4 so that an operator may pick up a tube from against the stops 6 and drop it into the trough 7. The trough 7 has a tube supporting platform 8 positioned therein and slidable upon the bottom 9 of the trough. The platform 8 has an upright 10 attached thereto to which are attached a plurality of adjusting rods 11. A rod 12 is carried by an extension 13 projecting inwardly from the top of the upright 10 towards the vertical center of the trough and this rod 12 is spirally grooved to provide alternate grooves 14 and spiral ribs 15. A second rod 16 is rigidly supported at the top of the trough 7 directly opposite the rod 12 and, like the rod 12, it is provided with alternate spiral ribs 17 and grooves 18. The ribs 15 and 18 on the rods 12 and 16 are, as clearly shown in Figures 3 and 4 of the drawings, cut away to provide straight surfaces indicated at 19. The rod 16 is rigidly connected to the trough 7 by suitable means and the rod 12 is rigidly connected to the upright 10 for movement with the upright as hereinafter specified.

The adjusting rods 11 are connected to pivoted cranks 20 which are pivotally connected as shown at 21 to the outer side of the trough 7. Each of the cranks 20 has a nut 22 swivelly connected to its outer end through the medium of the yoke 23 and fins 24. The nuts 22 have rod receiving openings 25 through which the operating rod 26 extends. The nuts are counterbored as shown at 27 and the ends of springs 28 and 29 engage in the counterbores. The springs 28 and 29 are tensioned by nuts 30 threaded upon the operating rod 26. The operating rod 26 is connected to an air cylinder structure 31 or other suitable operating mechanism of any approved type which may be controlled by a foot pedal 32 or any other suitable type of control member so that by manual operation of the control member 32 the rod 26 may be shifted to move the platform 8, upright 10 and rod 12 outwardly towards the outer side of the trough 7 so as to permit a finned tube to be dropped or placed between the rods 12 and 16 upon the platform 8 after which the operating mechanism 31 is operated in a reverse direction to move the platform 8, upright 10 and rod 12 inwardly so that the spiral grooves 15 and 18 of the rods 12 and 16 will receive the edges of the spiral fins 3 on the tube 1 as clearly shown in Figure 4 of the drawings, thus securely holding the finned tube in position within the trough without mutilating the perimeters of the fins.

Means are provided for forming the transversely extending lips 34 on the fins. These lips are formed by bending the fins so that the lips are based on a line lying in the plane of each fin, with all of the base lines lying in a plane approximately parallel to the axis of the tube, as clearly shown in Figure 12 of the drawings, the outer edge of one fin overlaps the line of junction between the lip and the fin of the adjacent lip.

The means for forming the lips 34 includes a wheeled car or wheeled structure 35, the supporting wheels 36 of which are flanged as shown in Figure 7 of the drawings, and ride upon the upper edges of the sides 38 of the trough 7. The wheeled car 35 has a bending roller carrying plate 39 adjustably connected thereto by means of a bolt 40 and spring 41 which spring tends to urge the carrying plate 39 upwardly. A bending roller 41' is rotatably carried by the carrying plate 39 and its width determines the width or rather the length of the lips 34 along the fins. As clearly shown in Figures 6 and 7 and 4 of the drawings, the roller 41' projects downwardly between the rods 12 and 16 for engagement with the fins 3 as the car is moved along the trough 7.

The carrying bar 39 has a cam 43 rotatably carried thereby and operated or adjusted by a hand lever 44. The perimeter of the cam 43 engages an adjustable stop 36 carried by the wheeled car or support 35 for adjusting the position of the bending roller 41' and, consequently, regulating the transverse width of the lips 34.

After a finned tube has been placed in the trough 7 and is firmly held therein by engagement with the rods 12 and 16, the wheeled support or car 35 is manually moved along the trough with the roller 41' engaging the fins 3 and bending them over to form the lips 34. A suitable weight 48 is carried by the car 35 to facilitate the bending of the fins. The fins may be partially bent to their permanent position upon movement of the car in one direction along the trough with the roller 41' in one adjusted position after which the lever 44 is operated as shown in dot and dash lines in Figure 6 of the drawings to lower the roller 41' and the car is then moved in the reverse direction along the finned tube to complete the bending of the lips.

After the fins 3 have been bent to form the lips 34 the finned tube is moved longitudinally from the trough 7 onto a conveyor belt 50. The finned tube with the lips formed thereon moves along with the conveyor belt past the lip bonding agent applying means 51. The bonding agent applied to the lips 34 may be of any suitable material for bonding the lips one to the one next thereto as indicated at 49 in Figure 12 of the drawings. However, it is preferable to use a bonding resin of the ethoxyline class of resins, such resin being used alone or having aluminum powder thoroughly mixed therewith as desired. If it is so desired the bonding resin may also be applied to the tube 1 and the inner edges of the fins 3 as shown at 49'. The bonding agent is distributed from its containing cup 52 under control of a manually operated valve 53 directly upon the lips 34 as the finned tube moves along with the conveyor belt 50. When using bonding resins of the type above specified it is necessary that these resins be continuously mixed so that a suitable mixing mechanism of any approved type is shown at 54. After the bonding resin is applied to the lips 34 the excess resin is removed from the lips by a flexible brush 55 and the conveyor 50 carries the lipped finned tubes onwardly into an oven or heater 56. After the tubes have been carried into the oven or heater 56 they roll from the conveyor and are retained in the oven sufficient length of time to thoroughly harden and dry the resinous bonding agent which has been applied to the lips of the fins. The oven 56 is maintained at a predetermined temperature by any suitable type of heating means. The thoroughly dried tubes with the fixed bonding agent thereon are rolled from the oven 56 upon a ledge 57 and are moved along this ledge over a saw table 58 which carries a swinging saw structure 59 of any suitable structure. The saw 59 is manually operated to cut the lipped finned tubes in the desired length and after being cut in the desired lengths they move onto a suitable supporting table 60 from which they are removed for packing for shipment.

Figure 1 of the drawings shows a trough 61 for containing the blank tubes before the metal ribbon is rolled thereon to form the fins but this is merely a matter of convenience so that a compact complete mechanism is provided for practically continuously moving the tubes therethrough to complete the entire operation of the making of the lipped finned tubes.

It will be understood that the invention is not to be limited to the specific construction or arrangement of parts shown, but that they may be widely modified within the invention defined by the claims.

What is claimed is:

1. In apparatus for forming lipped finned tubes, the combination of a tube receiving member for receiving finned tubes, a tube supporting platform movably mounted on said member, tube gripping elements along said member embodying projections for extending between the fins of a tube, means connecting one of said tube gripping elements and said platform for unitary movement to move a tube into gripped position between the tube gripping elements, means for moving said platform and element, a car movable over said member, means for guiding movement of said car, a lip bending roller carried by said car and engageable in fin bending action with the fins on a tube on said member as the car moves along said member, and means for adjusting said roller to regulate the degree of bending of the fins to form lips.

2. Apparatus for forming lipped finned tubing as claimed in claim 1 wherein said tube gripping elements include a stationary threaded rod along one edge of said member, a movable threaded rod along the opposite edge of said tube, the threads on said rod arranged to engage between the fins on a tube, and means for moving said movable threaded rod into and out of engagement with a finned tube.

3. Apparatus for forming lipped finned tubing as claimed in claim 1 wherein said tube gripping means includes a stationary threaded rod along one edge of said member, a movable threaded rod along the opposite edge of member, the threads on said rods arranged to engage between the fins on a tube, a tube supporting platform connected to and movable with said movable threaded rod, and means for moving said movable rod and platform to move a tube on the platform and said movable threaded rod to firmly grip a tube between the stationary and movable threaded rods.

4. In apparatus for forming lipped finned tubes, the combination, of a tube receiving member for receiving finned tubes, a tube supporting platform movably mounted on said member, tube gripping elements along said member embodying projections for extending between the fins of a tube, means connecting one of said tube gripping elements and said platform for unitary movement to move a tube into gripped position between the tube gripping elements, means for moving said platform and element, a car movable over said member, means for guiding movement of the car over said member, a bending roller carrying bar adjustably supported on said car, a lip bending roller rotatably carried by said bar and engageable in fin bending action with the fins on a tube on said member as the car moves along the member, and means for adjusting said bar to regulate the degree of bending of the fins by said roller in the formation of the lips.

5. Apparatus for forming lipped finned tubing including, a trough for receiving a finned tube, a tube supporting platform slidably supported in said trough, a spirally grooved rod rigidly carried by one side of said trough and having the grooves therein cut to receive the fins of a finned tube, an upright connected to said platform and movable therewith, a second spirally grooved rod carried by said upright and having the grooves therein cut to receive the fins of a finned tube supported on said platform, and means for moving said platform to move a finned tube supported thereon into engagement with said stationary grooved rod, whereby the finned tube will be gripped between the two grooved rods.

6. Apparatus for forming lipped finned tubing as claimed in claim 5 wherein said platform moving means includes a pivoted crank arm for moving said platform, an operating rod, and means yieldably connecting said crank arm to said operating rod.

7. Apparatus for forming lipped finned tubing as claimed in claim 6 wherein the upper edges of said trough form supporting rails, and means movable over said supporting rails for bending portions of the fins of the finned tube to form laterally extending lips on the fins and means for guiding movement of said lip forming means over said supporting rails.

8. Apparatus for forming lipped finned tubing as claimed in claim 6 wherein the upper edges of said trough forms supporting rails, a lip bending roller movable over said supporting rails for bending engagement with the fins of a finned tube in said trough to form laterally extending lips on the fins and means for guiding movement of said lip forming means over said supporting rails.

9. Apparatus for forming lipped finned tubing as claimed in claim 6 wherein the upper edges of said trough forms supporting rails, a lip bending roller movable over said supporting rails for bending engagement with the fins of a finned tube in said trough to form laterally extending lips on the fins, guiding means for said roller supporting means for said roller, and means for adjusting the position of said roller to regulate the degree of bending of the fins of the finned tubes.

10. Apparatus for forming lipped finned tubing as claimed in claim 5 wherein the upper edges of said trough form supporting rails, a car movable over said rails, and means carried by said car for engaging the fins of a finned tube held in said trough for bending laterally extending lips on said fin.

11. In an apparatus for forming lipped finned tubing, a finned tube receiving member, means for holding a finned tube against movement on said member, car supporting and guiding means on said member, a car movable over said supporting and guiding means, means carried by said car for engaging the fins of a finned tube on said member for bending laterally extending lips on the fins, said finned tube holding means including a stationary spirally grooved rod having grooves therein cut to receive the fins of a finned tube, and a movable spirally grooved rod having its grooves cut to receive the fins of a finned tube, and means for moving said movable spirally grooved rod to grip a finned tube between the rods.

12. In an apparatus for forming lipped finned tubing, a finned tube receiving member, means for holding a finned tube against movement on said member, car supporting and guiding means on said member, a car movable over said supporting and guiding means, means carried by said car for engaging the fins of a finned tube on said member for bending laterally extending lips on the fins, said finned tube holding means including a rigidly supported spirally grooved rod having the grooves therein cut to receive the fins of a finned tube and a movable spirally grooved rod having the grooves therein cut to receive the fins of a finned tube, and means for moving said movable spirally grooved rod to grip a finned tube between the grooved rods.

References Cited in the file of this patent

UNITED STATES PATENTS

| | | |
|---|---|---|
| 30,735 | Jones | Nov. 27, 1860 |
| 128,641 | Low | July 2, 1872 |
| 285,557 | Berton | Sept. 25, 1883 |
| 713,894 | Macfarren | Nov. 18, 1902 |
| 837,527 | Williams | Dec. 4, 1906 |
| 1,095,477 | Still | May 5, 1914 |
| 1,729,076 | Laycock | Sept. 24, 1929 |
| 1,732,415 | Owston | Oct. 22, 1929 |
| 1,818,593 | Walworth | Aug. 11, 1931 |
| 1,975,422 | Hellenbroich | Oct. 2, 1934 |
| 2,162,694 | Berg | June 20, 1939 |
| 2,368,403 | Barnes | Jan. 30, 1945 |
| 2,429,801 | Butler | Oct. 28, 1947 |
| 2,486,494 | Rice | Nov. 1, 1949 |
| 2,516,871 | Haugen | Aug. 1, 1950 |
| 2,529,545 | Edwards | Nov. 14, 1950 |
| 2,609,068 | Pajak | Sept. 2, 1952 |
| 2,635,571 | Edwards | Apr. 21, 1953 |

FOREIGN PATENTS

| | | |
|---|---|---|
| 558,124 | Great Britain | Dec. 22, 1943 |